United States Patent [19]
Tomlinson

[11] Patent Number: 5,964,928
[45] Date of Patent: Oct. 12, 1999

[54] PROTECTIVE COATINGS FOR METALS AND OTHER SURFACES

[75] Inventor: Charles E. Tomlinson, Martinsville, Ind.

[73] Assignee: Natural Coating Systems, LLC, Martinsville, Ind.

[21] Appl. No.: 09/041,441

[22] Filed: Mar. 12, 1998

[51] Int. Cl.$^6$ ............................. C23C 22/05; C09D 5/00; C09D 5/08

[52] U.S. Cl. .................................. 106/14.21; 106/14.12; 106/14.13; 106/14.14; 106/14.15; 106/14.16; 106/14.17; 106/14.44; 148/247; 148/269; 148/275

[58] Field of Search .................................. 148/247, 269, 148/275; 106/14.21, 14.44, 14.12, 14.13, 14.14, 14.15, 14.16, 14.17

[56] References Cited

U.S. PATENT DOCUMENTS

| | | | |
|---|---|---|---|
| 3,969,152 | 7/1976 | Melotik | 148/256 |
| 4,338,140 | 7/1982 | Reghi | 148/247 |
| 4,359,347 | 11/1982 | Da Fonte, Jr. | 148/270 |
| 4,462,842 | 7/1984 | Uchiyama et al. | 148/247 |
| 4,470,853 | 9/1984 | Das et al. | 148/247 |
| 4,863,706 | 9/1989 | Wada et al. | 423/277 |
| 5,128,065 | 7/1992 | Hollander | 252/394 |
| 5,156,769 | 10/1992 | Cha et al. | 252/395 |
| 5,192,374 | 3/1993 | Kindler | 148/272 |
| 5,194,138 | 3/1993 | Mansfeld et al. | 148/247 |
| 5,209,788 | 5/1993 | McMillen et al. | 148/247 |
| 5,322,560 | 6/1994 | DePue et al. | 106/404 |
| 5,362,335 | 11/1994 | Rungta | 148/272 |
| 5,380,374 | 1/1995 | TOmlinson | 148/247 |
| 5,397,390 | 3/1995 | Gorecki | 106/287.11 |
| 5,399,210 | 3/1995 | Miller | 148/273 |
| 5,441,580 | 8/1995 | Tomlinson | 148/242 |
| 5,525,560 | 6/1996 | Yamazaki et al. | 501/103 |
| 5,662,746 | 9/1997 | Affinito | 148/247 |
| 5,759,244 | 6/1998 | Tomlinson | 106/14.14 |

FOREIGN PATENT DOCUMENTS

| | | |
|---|---|---|
| 1 504 494 | 3/1978 | United Kingdom. |
| 2 084 614 | 4/1982 | United Kingdom. |

OTHER PUBLICATIONS

Connick et al., *J. Am. Chem. Soc.* vol. 71, The Aqueous Chemistry of Zirconium (Sep. 1949), pp. 3182–3184, 3186–3187, and 3190–3191.

Greenwood et al., *Chemistry of the Elements*, (1984) p. 1425 No Month.

Kendig et al., *Corrosion Science*, vol. 34, No. 1, The Mechanism of Corrosion Inhibition by Chromate Conversion Coatings from X–Ray Absorption Near Edge Spectroscopy (XANES), (May 1992), pp. 41–49.

Nebergall et al., *General Chemistry* 6$^{th}$ Ed., Covalent and Ionic Radii of the Elements (1980) No Month.

Tomlinson, *Cadmium and Chromium Alternatives: An Information Exchange*, (Nov. 5–7, 1997) p. 30.

Lewis Research Center, *NASA Tech Briefs, Materials* (Jan. 1998), p. 68.

Thomas et al., *J. Am. Chem. Soc.* vol. 57, Basic Zirconium Chloride Hydrosols (1935), pp. 1825–1828, No Month.

*Primary Examiner*—Anthony Green
*Attorney, Agent, or Firm*—Leydig, Voit & Mayer, Ltd.

[57] ABSTRACT

Compositions and processes are disclosed for producing improved environmental protection, corrosion resistance and improved paint adhesion for metals e.g., ferrous, aluminum, or magnesium alloys, as well as other substrates upon contact. The compositions and processes comprise use of one or more Group IV-A metals, such as zirconium, in combination with one or more Group III-A metals, such as cerium, in an acidic solution with one or more oxyanions or other non-fluoanions to stabilize and solubilize the metals while fluorides are specifically excluded from the processes and compositions above certain levels. The processes can contain pretreatment stages that serve to activate a substrate surface and/or promote formation of mixed-metal oxide matrices through use of an oxygen donor. The compositions are at a pH below about 7.0 and are preferably in a range between about 1.0 and about 4.0. The coatings may contain surfactants, sequestering agents, or organic additives for improved corrosion protection and paint adhesion. The substrate may be treated by immersion, spray, fogging or rollcoat.

31 Claims, No Drawings

PROTECTIVE COATINGS FOR METALS AND OTHER SURFACES

TECHNICAL FIELD OF THE INVENTION

The present invention pertains generally to coatings for metals and other substrates such as glasses, paints, and cements. In particular, the present invention relates to coatings that are particularly effective in protecting alloys that are prone to pitting corrosion such as those of steel, magnesium and aluminum. For example, the present invention has shown to be particularly effective for protecting high copper alloys of aluminum such as 2024 T3.

BACKGROUND OF THE INVENTION

In recent years a need has arisen for coating compositions that will function to replace chromates in metal treatment. This is due to the detrimental health and environmental impact that has been determined to be associated with chromium compounds. There is also a need for a coating that is formed from an aqueous solution with no organic solvents used. This eliminates the disposal and emission considerations involved in producing zirconates and other metal oxide-containing coatings from sol-gel applications, while providing a broad-spectrum replacement for chromates.

There are believed to be several mechanisms by which chromates provide protection to an underlying substrate. While the complete source of the protection has not been fully elucidated, there has been considerable research to identify each aspect of the chromate mechanistic model. In *Corrosion Science*, 34 (1), 41 (1993), Kendig, Davenport and Isaacs used XANES to demonstrate variable valence states of chromium in chromate coatings. This revealed both the +3 and +6 oxidation states. The chromium in both states is present as oxides. The +3 state forms a stable "long-range" oxypolymer and the chromium remaining in the +6 state, which is trapped in the film, has limited long-range structure.

The protection would then come from at least two mechanistic aspects. One is the physical aspect of protection provided by the stable +3 oxide matrix. A secondary protective source is the +6 chromate in the film. The trapped reservoir of +6 chromate is in some way available to heal the film in some fashion once corrosive attack begins. Many chromate-free chemical conversion coatings for metal surfaces are known to the art. These are designed to render a metal surface "passive" (or less "reactive" in a corrosive environment), leaving the underlying metal protected from the environment. Coatings of this type that produce a corrosion resistant outer layer on the base metal or its oxide often simultaneously produce a surface with improved paint adhesion. Conversion coatings may be applied by a no-rinse process, in which the substrate surface is treated by dipping, spraying, or roll coating. The coatings may also be applied in one or more stages that are subsequently rinsed with water to remove undesirable contaminants.

Several metal and metaloid elements will form a continuous three-dimensional polymeric metal- or metaloid-oxide matrix from aqueous solutions. Chromium shares this characteristic along with silicon and other elements. The Group IV-A elements continue to be attractive candidates for chromate replacement technologies as they share the virtue of being relatively innocuous environmentally and have common valences of +4, facilitating the formation of three dimensional amorphous coatings.

Chromate-free conversion coatings are generally based on chemical mixtures that in some fashion will react with the substrate surface and bind to it to form protective layers. The layer or layers may yield protection through galvanic effects or through simply providing a physical barrier to the surrounding environment.

Many of these conversion coatings have been based on Group IV-A metals such as titanium, zirconium and hafnium, a source of fluoride and a mineral acid for pH adjustment. Fluoride has typically been considered to be necessary to maintain the Group IV-A and other metals in solution as a complex fluorides. The fluoride may also serve to keep dissolved substrate metal ions (such as aluminum) in solution.

For example, U.S. Pat. No. 4,338,140 to Reghi discloses a coating for improved corrosion resistance with solutions containing zirconium, fluoride and tannin compounds at pH values from 1.5 to 3.5. Optionally, the coating may contain phosphate ions.

U.S. Pat. No. 4,470,853 to Das is related to a coating composition comprised of zirconium, fluoride, tannin, phosphate, and zinc in the pH range of 2.3 to 2.95. According to Das, it is important that approximately 10 atomic percent of zirconium-zirconium oxide be present in the coating to obtain "TR-4" corrosion resistance. It was shown that coatings of higher zirconium oxide content produced excellent corrosion resistance. Compositions which gave higher zirconium oxide on the surface were preferred in the disclosures.

U.S. Pat. No. 4,462,842 to Uchiyama and U.S. Pat. No. 5,380,374 to Tomlinson disclose zirconium treatments in solutions containing fluorides which are followed by treatment with silicate solutions. This combination is suggested to form zirconate and syloxyl linkages (—O—Zr—O—Si—O—Si— . . . ), yielding a coating with improved corrosion resistance over the zirconium treatment alone. Coatings of this type give excellent corrosion protection but very poor paint adhesion.

The compositions and processes of Uchiyama are useful in producing hydrophilic surfaces. The compositions of Tomlinson purportedly do the same when subsequently treated per Uchiyama. The compositions of Tomlinson are high in Group II-A metals, which somewhat improve the latent corrosion protection of the fluoro-Group IV-A coating formed. The drawback is that the solubility of Group II-A components is limited, therefore the opportunity to formulate stable concentrates may not be possible.

Additionally, coating compositions high in the Group II-A elements tend to generate considerable scaling as described by Reghi in U.S. Pat. No. 4,338,140. While an incremental improvement in paint adhesion may be afforded by Group II-A metal inclusion in some aspect of the present invention, they may actually inhibit formation of the continuous amorphous metal oxide matrices in some cases.

In Reghi and in U.S. Pat. Nos. 5,380,374 and 5,441,580 to Tomlinson, Group I-A and Group II-A elements probably incorporate as "discrete," non-bonded cations, perhaps providing some space-charge stabilization to balance discrete anions in the coatings. But these compositions likely provide little if any long-range structure.

U.S. Pat. No. 4,863,706 to Wada discloses a process for producing sols and gels of zirconium and a process for producing zirconia. The processes described include reactions to produce basic boratozirconium and basic boratozirconium chloride sols. These were purportedly used in producing boratozirconium and boratozirconium chloride gels. Further described is a method for producing zirconia from the gels at relatively low temperature. The essential components include a boron compound along with a polyvalent metal, zirconium and chloride.

U.S. Pat. No. 5,397,390 to Gorecki discloses an adhesion promoting rinse containing zirconium in combination with one or more organosilanes and fluoride. The compositions are used to rinse surfaces after they have been treated in a phosphating bath. The zirconium ion concentration is selected to maintain pH in a broad range as the silanes deposit on the substrate to promote paint adhesion and improve corrosion resistance. Organosilanes are necessary components of the disclosed compositions. Additionally, in preparing the compositions, Gorecki indicates that whenever zirconium-containing salts such as zirconium basic carbonate, zirconium hydroxychloride and zirconium oxychloride are used as a source (of zirconium) the salts must be dissolved in 50% hydrofluoric acid in order to effect dissolution. Gorecki does not indicate a necessity to dissolve the fluorozirconate salts mentioned in his disclosure. This demonstrates that fluoride is a necessary component of the disclosed compositions as it is included as part of the fluorozirconate salts or from hydrofluoric acid.

Brit. Pat. 1,504,494 to Matsushima describes a process for treating metal surfaces using zirconium at a pH above 10.0. A zirconate coating is formed but the pH of the solution is maintained above the present invention.

In pending U.S. patent application by Tomlinson, compositions with fluoride to Group IV-A metal at a molar ratio of less than or equal to two to one and zero to one are disclosed. Although the compositions are effective in providing corrosion resistance to many substrates (such as, for example, low copper aluminum alloys such as type 3003) protection from pitting corrosion on high-copper 2024 aluminum is still only on a par (depending on the activator and conditioners used) to what is seen for most chromates.

One avenue of research into protecting the copper bearing aluminum alloys has been to provide compositions that contain azole derivatives to complex any copper that dissolves during corrosive attack. This can happen through various cells that can be established at copper inclusions at the surface of these alloys. U.S. Pat. No. 5,128,065 to Hollander discloses this type of chemistry. The azoles of this type and some of those disclosed by Cha in U.S. Pat. No. 5,156,769 show some promise.

U.S. Pat. No. 3,969,152 to Mclotik discloses compositions containing rare-earth metals for improving corrosion resistance and paint adhesion to treated substrates. Generally, cerium was used in acidic systems. The aqueous compositions were effective at concentrations of 0.000001 molar and higher. Several acid-soluble transition metals were also used in the compositions and were particularly effective for sealing phosphated metals. No reference is made to the use of Group IV-A metals in low-fluoride compositions.

U.S. Pat. No. 4,359,347 to Da Fonte discloses compositions containing oxidizing agents, iron and cobalt. Additionally, cerium may be added to "activate" the bath, which, unless otherwise stated, is not analogous to the "activation language" used to describe surface activation herein. Group IV-A metals are not required in the compositions.

U.S. Pat. No. 5,192,374 to Kindler discloses compositions that form hydroxides and oxides in the pores of boehmited aluminum. The compositions were shown to be effective in improving properties of the aluminum hydrate formed by exposure to high temperature water. The present invention will also improve this type of layer with much less severe processing conditions being required to obtain the desired properties. The disclosure does demonstrate that a subsequent treatment with silicate may be useful as a seal. While benefits of adding metals such as lithium, aluminum and sodium are claimed, the Group IV-A metals are not shown.

U.S. Pat. No. 5,194,138 to Mansfeld claims non-halide compositions containing cerium, which would exclude fluoride. Although there are purported benefits to using a molybdenum treatment, the resulting systems will suffer from the absence of the amorphous polymeric Group IV-A matrix, which provides a stable physical barrier.

U.S. Pat. No. 5,209,788 to McMillen discloses compositions containing various amino compounds used in conjunction with either Group III-A or Group IV-A transition metal compounds. Group IV-A metals combined with the amino compounds and various organics are claimed for passivating phosphated surfaces. Although McMillen discloses use of the individual groups, there is no suggestion of the two metal groups exhibiting a synergistic complement with respect to each other.

U.S. Pat. No. 5,322,560 to DePue discloses combinations of rare-earth metals with Group IV-A metals in a matrix which produces a "slightly water-soluble" (no more than 0.001 moles per liter) time release corrosion inhibitor. The compositions are alkaline and applied to aluminum flake pigments. It appears the components are mixed in such a fashion that they react with each other along with additional ingredients, notably silicon salts such as sodium metasilicate. Combination of Group III-A with Group IV-A metals in an acidic, low fluoride, aqueous medium where they enjoy a high level solubility is not evident. The coatings produced by these alkaline compositions appear to be sol-gel type analogues.

U.S. Pat. No. 5,525,560 to Yamazaki discloses compositions to produce stabilized zirconia ceramics using Group III-A oxides. Temperatures for producing zirconia-based Group III-A stabilized ceramics are typically above 500° C.

U.S. Pat. No. 5,362,335 to Rungta discloses cerium incorporation into an aluminum oxide surface. This is similar to use of various metals, such as nickel and certain Group III-A metals, for sealing anodized aluminum. The low fluoride Group IV-A coatings of U.S. patent application Ser. No. 08/723,464 are also effective in sealing anodized aluminum.

U.S. Pat. No. 5,399,210 to Miller discloses the combination of cerium chloride with potassium permanganate alone or in combination with strontium chloride. Additionally, silanes may be added to improve properties of the coating. The coatings produced are mixed hydroxides and oxides.

The prior art approaches fail to address the need for environmentally sound coatings which can be used in a broad-spectrum of applications. Typically, coatings which have been developed to replace chromates do so in select applications, such as the use of silicates for unpainted air conditioning evaporators or silane treatments to enhance paint adhesion on substrates such as automotive air conditioning condensers.

There are many organic systems which can be used for improving corrosion resistance, but these typically involve use of solvents, rendering compositions which have VOC impact on the environment. It can be seen from the foregoing that the compositions of the prior art have not used Group IV-A metals combined with rare-earth metals in an aqueous, non-organic solvent system that excludes high levels of fluoride specifically. Additionally, the prior art does not show formation and attachment of Group IV-A gels, incorporating rare-earth elements, from acidic aqueous solution without using organic solvents. Sol-gels are macromolecular units rather than discrete atoms or molecular units and are typically prepared from metal-alkoxy precursors in solvent-based solutions that are unstable in water.

In addition, many health and environmental benefits of eliminating or reducing fluoride have been addressed in systems based on chemistries other than those of the Group IV-A metals used with Group III-A metals. Examples are described in UK Pat. Application 2,084,614 by Higgins.

In view of the foregoing, it can be seen that there exists a need for an improved "complete-spectrum" coating which can be used in a number of applications, and which is also environmentally sound and has a low impact in the workplace. This is currently a particularly strong need in aerospace and other applications where high-copper aluminum is used in large quantities due to its strength characteristics. The present invention provides such a coating.

Additionally, there is a need for compositions which render a surface highly resistant to corrosion and simultaneously provide a hydrophilic paint base. Hydrophilic Group IV-A/silicate coatings give excellent corrosion resistance but are generally unacceptable as a paint base. Hydrophobic, low fluoride Group IV-A coatings provide excellent corrosion resistance and paint adhesion, but they develop a hydrophobic surface which is detrimental to efficient heat exchange in applications such as for evaporators in automotive air conditioning units. They are ideal as paint bases for condensers in automotive air conditioning units, which are typically painted black for aesthetic and protective purposes.

Automotive air conditioning condensers and evaporators are typically produced in one plant. Therefore, a single coating for each is desirable to save on floor space and capital equipment costs. This is one need the present invention addresses as the coatings produced can have formulants balanced such that each criterion can be met to the degree individual manufacturers specify.

From the foregoing, it will be appreciated that there exists a need for broad-spectrum coating systems which are aqueous, promote paint adhesion and environmental resistance simultaneously. Additionally, it is desirable that such systems be balanced with regard to their hydrophilic to hydrophobic nature. In this way, systems can be designed to make available a "single-package" product for coating a number of products with differing performance requirements in a single facility. It is further desirous that the coatings impart superior corrosion protection to metal substrates.

It is an object of the present invention to provide such compositions, as well as processes for coating substrates that incorporate said compositions. These and other objects and advantages of the present invention, as well as additional inventive features, will be apparent from the description of the invention provided herein.

BRIEF SUMMARY OF THE INVENTION

The present invention provides aqueous compositions and processes for coating substrates, such as, for example, metals, glasses, paints, ceramics, cements, and combinations thereof. The aqueous compositions comprise at least one dissolved Group IV-A element. The compositions also comprise at least one Group III-A element, including the lanthanides, non-fluoanions, and, optionally fluoride in an acidic system. When fluoride is present, it is kept at levels where it least interferes with production of "long-range mixed-metal oxide polymer" yet imparts characteristics such as improved paint adhesion. In no case is fluoride present in an amount such that its bonding, coordination, or complexation yields a ratio of more than four fluoride atoms per Group IV-A atom plus three fluoride atoms per Group III-A, rare-earth atom. For purposes of the present invention, the lanthanides are considered to be members Group III-A, rare-earth elements.

In accordance with another aspect of the present invention, a process for coating said substrates comprises treating a substrate surface with the compositions and then allowing the compositions to dry on the substrate surface. Preferably, pretreatment stages are used which can be considered to activate and/or condition the substrate surface in preparation of application of the present invention. These steps may include, for example, solvent degrease, aqueous cleaning, deoxidization, anodizing, phosphating and other common surface preparations.

Advantageously, the present invention provides an environmentally sound alternative to chromium-based coatings. The compositions of the present invention provide broad-spectrum replacements for a multitude of applications as corrosion resistance, paint adhesion and hydrophilicity can be obtained with a single system. Additionally, the compositions can be prepared in such a fashion so as to provide superior corrosion protection on high-copper aluminum alloys. This is of particular importance to the aerospace industry as these alloys are commonly used in aircraft construction.

DETAILED DESCRIPTION OF THE INVENTION

For the purpose of promoting an understanding of the principles of the invention, reference will now be made to preferred embodiments and specific language will be used to describe how to make the best mode of the invention. It will nevertheless be understood that no limitation of the scope of the invention is thereby intended, such alterations and further modifications in the illustrated embodiments, and such further applications of the principles of the invention as illustrated herein being contemplated as would normally occur to one skilled in the art to which the invention pertains.

As described above, it is believed hexavalent chromium trapped in the trivalent chromium oxide film can act to "heal" the +3 chromate film once corrosive attack begins. One aspect of the mechanism may be that the +6 chromate reacts with corrosive elements of the environment, oxidizing them and changing their solubility characteristics. Simultaneously, since the +6 chromate is converted to a +3 chromate in this reaction, the film can be "healed" by the formation of this new, less soluble and "polymerizable" form.

Evidence of this type of phenomenon can be seen on a macroscopic scale in a corrosion chamber. Aluminum which has been coated with a heavy (2.0 or more grams per sq. meter) "yellow" chromate and placed in ASTM B-117 salt spray testing will gradually fade to a lighter yellow with a different hue. This is likely to due be to two phenomena.

One, hexavalent chromium is highly soluble; therefore some will "leach" out of the trivalent chromate matrix and wash away, causing the yellow to fade. It is the solubility of hexavalent chromium that makes it particularly pernicious as it can migrate into an organism, being solvated. After passing into the organism it is carried to various locations. At any given time, the hexavalent chromium can oxidize organic material, including genetic coding, and disrupt cellular function. Once the reduction to trivalent chromium has occurred, this less soluble and more toxic trivalent form is present to cause even more harm to the organism.

Secondly, some of the hexavalent chromium will migrate within the layer and act as an oxidizing agent to chloride or other corrosive component of the environment, thereby lending a more greenish hue as the hexavalent chromate is reduced to the trivalent form. With the change in oxidation states, less soluble forms of each element are produced within a pit, often effectively sealing it. This type of action (precipitative) is mimicked by chrome phosphates where the trapped phosphate, while not changing oxidation state, will form insoluble salts with base metal dissolving into a pit, again, providing a "sealing" component to the film.

The combination of Group IV-A elements with stabilizing aquo-anions in the presence of little or no fluoride have now proven to be compositions that will begin displacing chromates in many applications. These follow the trivalent chromate oxide matrix model, lending a physical barrier to the surface they protect. It has been shown that inclusion of "precipitating" agents such as phosphates can extend the protection of these low-fluoride Group IV-A coatings. This is typically done by incorporating these components through use of pretreatment stages.

If the model that includes a reservoir of redox active (oxidative) component trapped in the film (+6 chromate) is accurate, an analogous component in the Group IV-A matrices should take protection up significantly.

Through direct combination of Group III-A metals with Group IV-A metals, it is believed that the present invention has individual aspects to mimic most or all of the positive, protective aspects of conversion coatings based on hexavalent and trivalent chromium chemistry while being considerably safer for the workers supervising the processing. The present invention employs an organic or inorganic oxyanion and certain nonoxy-anions to stabilize Group IV-A and Group II-A ions in an aqueous acidic solution. With exposure of a surface to the solution and, with subsequent drying, production of a barrier of mixed-metal oxide coating is realized.

The compositions of the present invention produce coatings that are viable for replacing chromate coatings in any aluminum application, including sealing anodized aluminum. They have proven to be highly effective in forming a protective coating on all solid substrates on which they have been tested to date.

Compositions of the present invention perform exceptionally well on, for example, 2024 and 7075 aluminum. It is believed that the present invention has accomplished this by incorporating rare-earth elements which may enter into oxidation/reduction reactions more readily than Group IV-A metals will. This "change in oxidation state" changes the solubility properties of the elements involved and helps to seal or "heal" a pit after initiation. Regardless of the mechanism, compositions of the present invention have proven to provide a surprisingly large increase in protection.

At the same time the present invention provides an environmentally sound alternative that is superior to chromate and other chemical processes in its worker safety attributes. Additionally, the present systems provide an alternative that require no additional or exotic manufacturing equipment. They drop-in to existing equipment, even if a single treatment stage is all that is available.

The present invention incorporates Group III-A elements, inclusive of those having atomic numbers 58 through 71 (the lanthanides), into an inert oxide matrix. While the exact mechanism by which these elements (hereinafter referred to as "rare earth" or "Group III-A" elements interchangeably) enhance the protection of the formed matrix is not fully understood at this time, it is believed that there is a redox component which may mimic the chromate redox model. In the present invention, Group III-A metals probably also participate in production of continuous mixed-metal oxide coating matrices.

The lanthanides all have very similar properties to scandium, yttrium and lanthanum (thus the term "lanthanide") due to the lanthanide contraction. This is the phenomenon of a contracting atomic radius with increasing atomic number. The effect is that properties based on issues such as charge to radius in a given oxidation state are very similar for each. It is this same phenomenon that causes the chemical properties of zirconium and hafnium to be so similar. Elements exhibiting these commonalties are difficult to separate and typically are obtained together commercially in some relative molar ratio.

The rare-earths exhibit multiple valences, so cerium as well as other Group III-A elements have certain characteristics that make them particularly attractive for use in Group IV-A systems. Cerium will attain a +4 oxidation state. According to Cotton and Wilkinson in "Advanced Inorganic Chemistry," Wiley & Sons, (1980) p. 999, the chemistry of cerium in the ceric state is similar to zirconium. For this reason, it is preferred in one aspect of the current invention that cerium and zirconium be used in combination. The other rare-earth elements will have similar benefits in the present invention as they may also enter into various multi-state redox reactions. The Group IV-A elements exist almost exclusively in the +4 valence when oxidized. Titanium will reduce to +3 and +2, but generally only in uncommon environments.

It is significant that many of the Group III-A elements have been used in glasses to control absorption at particular wavelengths ("Chemistry of the Elements," Wilkinson and Eamshaw, Peragamon Press (1994) p. 1425). As coatings of the Group IV-A metals have proven to be relatively clear (nonabsorptive) to date, it is believed that combination with the Group III-A metals can screen out certain wavelengths of light which cause degradation of paints. Additionally, such coatings on glass may filter light rays harmful to the human eye. There is a multitude of significant applications for protective coatings in these areas which go beyond corrosion protection. But, the protection that can be lent to paints to the chemical environment is in and of itself extremely important. Such compositions could be sprayed onto an interstellar vehicle as a complete unit and give comprehensive, broad-spectrum protection to conditions of takeoff, space flight and conditions of reentry. Demand for protection of this nature appears to be significant. For example, according to information about the Mir space station in "Government News," Materials Performance, 37, 2 (1998), page 7, corrosion in space may occur. Lower technology applications are ubiquitous.

It is to be noted that the Group III-A metals form mixed hydroxylates in water, according to chemistry very similar to that of Group IV-A metals. In acid solutions, the metals exist as mixed hydroxylates whereas Group I-A and Group III-A exist primarily as aquo-coordinated cations. This property further indicates the Group III-A metals may form stable covalent oxide linkages, upon dehydration/condensation reactions, with Group IV-A metals when combined according to the present invention.

One remarkable aspect of the present invention is the very high solubility of rare-earth elements into working baths and concentrates of Group IV-A solutions when little or no-fluoride is present. It was anticipated that upon mixing fluoride-free acidic solutions of these metals that complete precipitation of the two metal groups would occur. It has now been determined that the presence of fluoride in many of these compositions will actually be a detriment to solvability.

It appears that as the metals react with fluoride, they become considerably less soluble in the range where they reach a nonionic form. It is believed that this is why it is common for prior art to state that compositions containing Group IV-A metals require "at least four fluorine atoms" per Group IV-A atom. This state is effectively a nonpolar, uncharged state (four fluorine atoms per Group IV-A atom) and, therefore, low solubility in a polar system such as water is observed. Having more than four fluorine atoms increases solubility as the Group IV-A complexes become more (negatively) charged as they move up in order to the higher hexafluoro forms, and are, therefore, more highly ionic. The terms "fluoride" and "fluorine" are generally used to designate the ion and the element, respectively. Fluorine also designates the ground state of fluorine ($F_2$, or fluorine gas). Therefore, to avoid ambiguity, the term "fluoride" is used herein to designate one fluorine atom when associated with Group IV-A and rare earth metals. The present invention, the Group IV-A and Group III-A atoms become more (positively) charged as they move to the lower order fluorides (Group IV-A with less than four fluorine atoms associated and Group III-A with less than three fluorine atoms associated). Additionally, as has been demonstrated, fluoride competes with oxygen in the process of forming the preferred amorphous mixed-metal oxide coatings. The uncharged state of a Group IV-A with Group III-A mixture containing fluoride bound to the metals can be expressed as: Moles of fluoride present=[4×(molar concentration of Group IV-A metal)]+[3×(molar concentration of Group III-A metal]+[3×(molar concentration of lanthanide metal)].

The relative balance of components in compositions that are stable can be developed by anyone skilled in the art. The relative molar ratios of Group IV-A metal to Group III-A metal to fluoride to preferred anion(s) can be determined at any pH in the range disclosed (that being below about 7.0, or any acidic solution). The balance, it is to be understood, can be manipulated to bring out desired properties of the film established on any given substrate surface. For metals, it is believed that the compositions will give optimum corrosion protection when no fluoride is present. Characteristics such as adhesivity to paints may improve with the addition of fluoride.

In the present invention, Group IV-A elements are believed to bond to active oxygen atoms on the substrate surface, leading to a thin Group IV-A/Group III-A film forming from a reaction analogous to the reaction of silicates. When the substrate surface is not rinsed before drying, the Group IV-A metal in the coating solution carried out with the substrate will bond to the thin film upon drying. The Group III-A metal will also incorporate in some fashion. Whereas silica "gels" form from alkaline solutions upon exposure to an acidic surface or one high in mono- and polyvalent cations, mixed Group IV-A/Group III-A "gels" will form on surfaces which are acidic or basic and those high in mono- and polyvalent cations. Upon drying at room or elevated temperature, a continuous polymeric mixed-metal oxide becomes fixed on the surface.

The present compositions and processes will give improved corrosion protection over mixed Group IV-A/Group III-A coatings containing fluoride in a ratios of greater than 4 fluoride atoms per Group IV-A atom plus 3 fluoride atoms per Group III-A atom. This is believed to be due to the fluoride competing with oxygen for bonding to the metals in the matrix. With an atomic ratio of fluoride to Group IV-A at or between four to one and zero to one, plus the (additive) atomic ratio of fluoride to Group III-A at or between three to one and zero to one, the probability that all metal atoms will incorporate in the coating as an oxide is higher than for systems containing higher fluoride levels. The term "order" is used here to describe the number of bonds a given metal element has to another element such as oxygen or fluorine; i.e. a second order zirconium fluoride has zirconium bonded to two fluoride atoms, a third order zirconium-oxygen compound has three zirconium to oxygen bonds, etc. With no fluoride present to compete with the oxygen, a three-dimensional mixed-metal oxide matrix with each metal atom bonded with up to four oxygen atoms will be established. Naturally occurring zirconates having this character are among the hardest, oldest and most stable inorganic compounds known.

Studies by Connick and McVey (J. Am. Chem. Soc., Vol. 71, 1949, pp. 3182–3191) demonstrated that fluoride complexes of zirconium are far more stable than any other complexes (oxyanion and chloride) in their studies. It is this high stability of the fluocomplexes which interferes with Group IV-A oxide polymer formation. Its presence diminishes the Group IV-A to oxygen bond density (number per unit volume) and thereby decreases the protective ability of the metal oxide film. It is to be noted that Connick and McVey included chloride in the study and found its affinity to be on a par with the nitrate oxyanion.

Thomas and Owens (J. Am. Chem. Soc. Vol. 57, 1935, pp. 1825–1828) found nitrate and chloride anions to be comparable in many regards in their studies of zirconium hydrosols and developed a hierarchy for the tendency of anions to coordinate with zirconium. Again, fluoride was very high while nitrate and chloride were very low. The only anion stronger than fluoride was hydroxide. In the present invention, the formation of Group IV-A hydroxides is intended with eventual dehydration reactions leading to zirconyl-, titanyl- or hafnyl-oxide matrices which incorporate Group III-A elements.

With regard to nonoxy-anions (such as chloride) which may be suitable for stabilizing Group IV-A and Group III-A metals (again, meant to include lanthanides as noted above) in aqueous solution yet still allowing the formation mixed-metal oxide matrices upon drying. For nonoxy-anions, the absolute value of charge to ionic radius ratio is the criterion for inclusion or exclusion in the group of preferred anions. For example, for a monatomic anion such as chloride with a charge of negative one and a radius of 1.81 Angstroms (According to Nebergall, Holtzclaw and Robinson, in: "General Chemistry," Publisher, D. C. Heath and Co., 1980) the value is $|-1/1.81|$ or 0.552. For fluoride, the ratio is $|-1/1.36|$ or 0.735. Therefore, it can be seen that when the ratio is below 0.735, the charge to radius (and therefore, overall atomic or molecular charge distribution) is such that the affinity will be lower than fluoride and acceptable for inclusion in the group of anions. An example of an anion excluded from the group would be sulfide with a charge of –2 and an ionic radius of 1.84 Angstrom units, resulting in a ratio of 1.087. Group IV-A and Group III-A sulfides are very stable and typically relatively insoluble as a result. This results in the exclusion of the $S^{2-}$ anion from the group of preferred nonoxy-anions.

In nonoxy-polyatomic anions, the radius may be considered to be the bond length between a central and periphery atom(s) (three or more atoms in the polyatomic anion) or simply the bond length in a diatomic anion. As with monatomic nonoxy-anions, the ratio of charge to radius determines the suitability for inclusion in the preferred group. Anions with an absolute ratio below 0.735 (charge to radius) are preferred.

The present invention may be used in processes where fluoride is used in preceding stages. This may cause accumulation of fluoride in the compositions of the present invention in some systems during processing. Fluoride may be tolerated in such cases up to a ratio not exceeding four fluoride atoms per Group IV-A atom, plus three fluoride atoms per Group III-A atom, in solution. It is to be understood that the presence of such fluoride is undesirable for compositions and processes described here but that such systems are still preferred to those with higher fluoride levels. In the prior art, fluoride is typically used at a ratio of at least four fluoride atoms per Group IV-A atom.

It should be further noted that the zirconate coatings containing fluoride are inferior to the same which are subsequently treated with silicate solutions. This indicates the silicate itself is superior to the fluorozirconates for protection and while the fluorozirconates give some benefit, they act primarily as a surface activator and attachment device for the silicate layers.

The present invention will provide improved, highly corrosion resistant conversion coatings based on Group IV-A with Group III-A metals by combining the metals with a stabilizing anion (oxyanions, haloanions and others) other than fluoride in acidic solution. The presence of fluoride in the solution is undesirable but may be tolerated up to a ratio of four fluoride atoms per Group IV-A atom plus three fluoride atoms per Group III-A atom.

The present invention provides improved mixed-metal oxide conversion coatings for metals such as, for example, steel, magnesium and aluminum alloys thereof and combinations thereof, as well as coatings for other substrates, such as, for example, cements, glasses, paints, and ceramics. The coatings are both highly corrosion resistant and simultaneously serve as an adhesion promoting paintbase. This performance is characteristic of chromate conversion coatings, but the present invention does not have the environmental hazards associated with chromates. The compositions and processes of the present invention are also advantageous over silicates because silicate coatings generally reduce paint adhesion.

The present invention provides chromate-free compositions and processes which provide a paint base which is a highly corrosion resistant, environmental barrier coating useful on metal substrates and other surfaces. An example of one surface which could be coated for the benefit of more than one of the protective properties provided by the present invention is described in NASA Tech Briefs, January, 1998, p. 68.

While applicant does not wish to be bound by any one particular theory, it is believed that the most significant source of protection comes from a mixed-metal oxide matrix. The matrix that is formed is analogous to a siloxyl network. Such siloxyl networks have been shown to be produced from alkaline silicate solutions upon their contact with an acidic surface followed by drying.

The use of a silicate in the present invention is generally restricted to a pretreatment stage or a subsequent sealing stage. There is a high level of incompatibility of silicates with the present invention in acid systems. Addition of silicates is not preferred in most instances inasmuch as they cause destabilization, precipitation and/or polymerization of the mixed metal oxides. They can be added to the present invention only to the extent that they do not affect solution stability.

Zirconium and cerium will be used here as an examples for illustrating combinations of Group III-A metals with Group IV-A metals in acidic aqueous systems. A zirconium cerate oxide matrix is formed when the compositions are dried onto a surface. A zirconyl matrix will be composed of —O—Zr[—O—]$_3$—Zr[—O—]$_3$—Zr[—O—]$_3$ structures that make up a three dimensional "zirconate polymer." When cerium or other rare-earth element is used in the compositions in the +4 oxidation state, it is interchangeable with Zr in the above metal oxide structure. When the rare-earth element is in the +3 state, it can incorporate into the matrix, but the molecular geometry will vary to the degree that the Group III-A or Group IV-A metal predominates in the composition. The matrices so formed can be described herein as "mixed-metal oxide polymers."

The invention is believed to be most efficacious when two or more stages are used. The fluoride-free or low fluoride mixed-metal solution is typically the final stage and it is preferred that no rinse be used prior to drying. Stages prior to the mixed-metal stage are included to prepare the substrate surface by cleaning and/or activation. The activation can include, for example, deoxidization, application of other types of coatings (chromate, or chromate-free, a zirconium fluoride attachment to an aluminum oxide surface, a rare-earth pretreatment stage, etc.) or a simple cleaning (with a cleaning agent such as a surfactant or a solvent degrease) or activation treatment of the naturally occurring oxide that exists on most metals. It is preferred that the surface be clean and the natural oxide remain intact prior to the present invention's application (and be activated in some fashion) as it will promote additional protection from a corrosive environment. It is preferred that the cleaning stage be the activation stage or be the stage prior to the activation stage.

A multiple stage process of more than two stages is most preferred, as improved bonding of the mixed-metal oxide matrix to the surface will be obtained when there has been an activation stage, and improved corrosion protection can be obtained when a supplemental "conditioning" stage is incorporated. The first stage contains a metal fluoride (preferably a Group IV-A metal) to activate the surface, succeeding stages to condition and oxidize components left by preceding stages, and the final treatment stage consists of a mixed Group III-A and Group IV-A metal solution. It is preferred that the oxidizing agent in one stage be one that is oxygen-containing, such as chlorate ion.

The fluoride in the initial stage acts to activate the metal oxide surface and the Group IV-A metal bonds, facilitating the subsequent mixed-metal oxide matrix film formation and attachment. It is believed that the oxidizing agent promotes formation of the metal oxide matrix by serving as a source of oxygen for the metals to bond to in the ensuing fluoride-free mixed-metal oxide stage. Contamination of the mixed-metal oxide stage with prior treatment solutions is to be avoided as they may induce premature gellation when rising to excessively high levels. This is to be avoided, as the treatment bath will be induced to completely and irreversibly gel in the treatment tank.

In one aspect of the present invention, a corrosion resistant conversion coating is provided comprising a Group IV-A metal such as titanium, zirconium or hafnium and an oxyanion such as nitrate, sulfate, acetate, etc.; or haloanion such as chloride; that will coordinate with zirconium but not form stable covalent metal-anion bonds, and a Group III-A metal. The pH of the solution is preferably below about 7.0, preferably between about 1.0 and about 4.0, and most preferably between 1.5 and 3.5. To adjust the pH to lower levels, it is preferred to use the corresponding acid of the anion (so the counter ion remains consistent), and to raise the pH of a solution. It is preferred to use a metal-free base. As such, hydrogen ion and the anion of the coating composition of the present invention will together comprise a conjugate acid-base pair. At increasing pH values, Group IV-A and Group III-A elements form higher order hydroxides. In the prior art, fluoride anion has been used to compete with hydroxides and hydroxide donors to inhibit formation of Group IV-A metal hydroxides. The stabilizing anions become displaced and various hydroxide species form according to the following reaction, as seen, for example, for zirconium:

$$Zr^{4+} + nH_2O \rightarrow Zr(OH)_n^{+4-n} + nH^+$$

The higher order hydroxide will, in turn, tend to form $ZrO_2$ which is undesirable because it is insoluble. At a pH of about 4.5 to 5.0 or higher, $Zr(OH)_4$ begins to increasingly predominate, leading to the formation of zirconium oxide through a dehydration reaction. [In particular, titanium, in dilute concentrations in the presence of high affinity oxyanions, has proven to be stable to the neutral pH range, but processability and practicability become compromised. Therefore, pH values below 5.0 are generally preferred for broad spectrum applications.] Higher levels of acid in solution (low pH values) push the equilibrium of this reaction to the left and, with sufficient anion(s) present, $Zr^{4+}$ remains soluble in solution and does not precipitate as the oxide ($ZrO_2$) formed dehydration reactions of the higher order hydroxides.

A proton from an acid can be considered to be competitive with the zirconium ion for a hydroxyl unit, yielding water and a soluble zirconium/hydroxyl/anion complex. This can be expressed by (with OA representing an oxyanion or other nonfluoride anion):

$$Zr(OH)_x^{+4-x} + nH^+ + mOA^{y-} \rightarrow Zr(OH)_{x-m}(OA)_m^{+4-m[y]-(x-m)} + nH_2O$$

Addition of an acid such as nitric is ideal for this as hydrogen ion is added along with nitrate, so, for example:

$$Zr(OH)_x^{+4-x} + nHNO_3 \rightarrow Zr(OH)_{x-n}(NO_3)_n^{+4-n-(x-n)} + nH_2O$$

Without high levels of fluoride, the acid and coordinating anion levels must be kept such that the pH is below about 7.0 and the anion is maintained at a level that it helps to form a soluble coordinate complex with the Group IV-A and Group III-A metals. The nature of the anion is important as relatively weak Lewis bases will coordinate with the metals but also allow them to easily form a coating when exposed to a substrate surface. Thus, it is least desirable to add directly in these applications the very strong Lewis base, hydroxide ion, as it will consume hydrogen ion and begin to compete with the preferred anions for coordination or attachment to the metals. This competition becomes increasingly strong (or more favorable) for hydroxide as pH goes up, reflecting a higher hydroxide concentration (and lower hydronium ion) and, therefore, higher probability of higher order metal hydroxides forming. This, in turn, leads to premature gellation or formation of the insoluble dioxides ($TiO_2$, $ZrO_2$ and $HfO_2$) through dehydration reactions.

The source of the oxyanion may be from various salts such, for example, a potassium nitrate, potassium nitrite, sodium sulfate, sodium acetate and others, but it is generally preferred that the solutions have minimal levels of cations such as potassium. Likewise, if a haloanion or other preferred anion is to be used, similar Group IA salts are acceptable, as is dissolution of fluoride-free Group IV-A and Group III-A salts in the haloacid (such as HCl, HBr, HI, etc.) Therefore, preparation of a zirconium and cerium solution is preferably performed with zirconium and cerium in the forms of the carbonates or other relatively pure form such as the metal in combination with the acid form of the anion. Nitric acid, sulfuric acid, boric or acetic acid and other "O-donor" acids are suitable for combining with forms such as the carbonate (as are the previously mentioned haloacids).

Solubilities and reaction times will depend upon the acid used. Nitric or hydrochloric acid will react quickly and give high solubility, whereas boric acid will react slowly and give low solubility. Nitrates, sulfates and other salts of Group IV-A and Group III-A metals are available and may be used while subsequently lowering the pH, when necessary, using the corresponding acid. Increasing the pH is preferably done using a metal-free base, preferably an organic oxygenaceous or nitrogenous Lewis base. Some azoles (metal-free nitrogenous bases) will have some solubility in the present invention and will bind copper ion, potentially providing a benefit when treating high-copper aluminum alloys. Use of Tris is preferred in one embodiment as it will act as a chelant as well as a buffer. Use of the corresponding oxyacid with carbonates of Group IV-A and Group III-A metals is most preferred.

As indicated, the Group IV-A metal may be titanium, zirconium or hafnium or any combination thereof. In most applications zirconium is used, due primarily to its commercial availability and lower cost. Additionally, solutions prepared with titanium would generally have to be more dilute than zirconium and hafnium due to its generally lower solubility. The Group III-A metal may be scandium, yttrium, lanthanum, actinium or the lanthanides or any combination thereof.

The levels of acid, anion, and chelants such as ethylenediaminetetraaccetic acid, which is commonlyavailable under the trade name of Versenex®, are maintained to keep certain metals in solution.

As silicates tend to gel readily below a pH of 10, it is expected that the Group IV-A elements in the presence of non-fluroanions will behave analogously above a pH of about 4.5 to 5.0. Therefore, to be in a pH range where gellation is facilitated yet the solution is stable, a pH of 1.0 to 4.0 will be most appropriate. As with silicates, the presence of cations (particularly polyvalent) can promote gellation and are acceptable in the coating solution to a limited extent, but are preferably introduced to the surface of the treated substrate prior to its exposure to the present invention. Therefore, in one embodiment, a pretreatment stage is used to accomplish this.

As with most conversion coatings, an elevated temperature of the treatment solution accelerates coating deposition. Here and in other references, inorganic silicates in water have been shown to form a coating in less than five minutes from 70 to 120° F. The higher temperature ensures completeness of reaction and accordingly a range of 100 to 130° F. is preferred in one embodiment of the present invention. Appropriate working solution temperatures for particular applications may be selected by persons skilled in the art and are not limited to the ranges described herein.

Acceptable coatings will form from solutions up to the solubility limit of the metals at a given pH. In the preferred range of pH, the best levels can be determined without undue experimentation by persons skilled in the art. In embodiments presented below, coatings will form with zirconium concentration from about 2067 to about 4,125 ppm in multiple combinations with cerium from about 371 ppm to about 4,452 ppm in the presence of nitrate. The best concentration of metals, anion, and hydronium ion, and fluoride will depend upon working bath temperature, method of application, substrate, desired properties etc.

Additional inorganic components may be added to enhance particular characteristics, such as paint adhesion or more rapid coating deposition. These would include phosphates, various cations, etc. Addition of oxides of elements such as tungsten may be useful in certain applications as they will incorporate into the matrix and modify the thermal stress characteristics of the coating. Studies of zirconium-tungsten oxides have shown geometric expansion upon cooling which can relieve stress crack formation in the coatings as they cool when they are dried at elevated temperature. Use of any additive will need to be balanced with how it destabilizes the coating solution. Silicates added would tend to destabilize the solutions even at near trace levels; this presents problems in preparing concentrates of the compositions. Silicates may be added to their "solubility" limits, but these levels are generally so low as to render the addition to be of no effect. Similar considerations are to be made for the stannates. They have attractive features, particularly for ferrous substrates, but they can be destabilizing.

One class of organic additives which have shown to be useful in several ways is that of oxygenated water-soluble compounds. Of particular benefit are organic oxygenates which are hydoxylated. Examples include BASF 1,6 hexanediol, Arcosolv® PTB and Air Products and Chemicals' Airvol® 125 polyvinyl alcohol (PVA). It is believed the hydroxyl functionality reacts with the Group IV-A hydroxylate and copolymerizes into the mixed-metal oxide matrix. This lends improved geometric stress tolerance to the coatings and increases the hydrophobic nature of the matrix. Of particular benefit are the highly hydrolyzed polyvinyl alcohols, one of which is mentioned above.

The coatings disclosed here are typically used as "dry-in-place" compositions. This can lead to "puddling" of the coating where it drains during drying. When an organic hydroxylate such as, for example, polyvinyl alcohol is added, the heavier "puddled" area shows excellent continuity after drying. These compositions lend considerably improved paint adhesion, and improved corrosion protection, at very low Group IV-A concentrations. They can be effective even when the Group IV-A metal is at micromole ($1.0 \times 10^{-6}$) per liter levels.

Corrosion resistance has been shown to as much as double with use of PVAs in fluoride-free Group IV-A compositions, with as little as 0.0125 weight percent being highly effective. The drawback to their use is that drying usually must occur at elevated temperature or corrosion protection is compromised. Whereas optimum protection can be had by drying at ambient temperatures with compositions void of the organic hydroxylates, temperatures up to 350° F. are indicated for systems with them. This is, naturally, due to the extra energy required to drive the metal hydroxylate to organic hydroxylate condensation through dehydration reaction.

Generally, as with other Group IV-A oxide coatings, where higher levels of acid help to maintain solubility of bath components, additional acid may be needed to stabilize the coating solution. Incorporation of stannates is also attractive as a structural component and should be of particular value when treating ferrous alloys, as would zincates. While the invention is directed at producing alternatives to coatings containing fluorides and/or chromates, a small amount of chromium may be added as chromate to improve aspects of the coating. Addition should be at levels which do not impact the hazard class of the waste generated from processing. This level is currently about 5 ppm chromium.

Working solutions composed of mixture(s) of the above components may be applied by spray, dip, and roll coat application. After the coating has been allowed to form, it may be rinsed, but a "no-rinse" process is preferred. The Group IV-A and Group III-A components that remain on the surface and are not rinsed off will become incorporated into the coating as it dries. There is an additional benefit in that coating components in solution are not rinsed into the waste stream of the processing facility. A chemical treatment stage may be used after the described treatment to further modify the coating's characteristics. This could include, for example, silicating, an oxidizing treatment or a sequence of Group IV-A treatments.

It will be appreciated by one of ordinary skill in the art that siccative coatings, which form an organic barrier, may also be necessary for decorative or other finishing characteristics of the product. In accordance with an aspect of the present invention, however, the adhesion will be far superior to that seen with silicates as the resultant surface will be acidic rather than alkaline, and fluorozirconates are commonly coated on metals to improve paint adhesion, particularly adhesion of oxygenated polymers such as epoxies and esters. Many of these finishes are commonly applied through electrostatic (e-coat) means. As with conventional application methods, improved adhesion performance would be expected in electrostatic applications.

Reference will now be made to proposed specific examples and how each would improve performance in several applications. It is to be understood that the examples are provided to more completely describe preferred embodiments, and that no limitation to the scope of the invention is intended.

Table 1: Compositions used to treat 2024 aluminum as shown in Table 2 with test results.

| Aqueous treatment solution | Description | Composition |
| --- | --- | --- |
| A-2024 | Acidic, proprietary activator for high copper aluminum alloys. | Metal fluoride(s), surface active agent(s) |
| C-ZT | Acidic, proprietary general purpose conditioner for metals and other substrate surfaces. | Mixed metal and nonmetals, surface active agent(s). |
| Oxidizer | Acidic, proprietary oxidizing solution. | 10 grams per liter $NaClO_3$ with nitric acid. |
| RS-Z | A solution prepared from Wah Chang ® zirconium carbonate and nitric acid, diluted to 1.0 liter with | Zirconium concentration is approximately 4,125 ppm. |

-continued

| Aqueous treatment solution | Description | Composition |
|---|---|---|
| | distilled water and pH adjusted to 2.2 to 2.3 with sodium bicarbonate. | |
| RS-Z 0.5 | RS-Z diluted 50% with distilled water. No significant change in pH upon dilution as zirconium buffers at this pH. | Zirconium concentration is approximately 2,067 ppm. |
| RS-Z-PVA | A solution prepared from zirconium carbonate and nitric acid, diluted to 1.0 liter with distilled water and pH adjusted to 2.2 to 2.3 with sodium bicarbonate. Added to this is AIRVOL ® 125 polyvinyl alcohol from Air Products and Chemicals, Inc. | Zirconium concentration is approximately 4,125 ppm, PVA is approximately 3,000 ppm |
| Ce—C | Cerium concentrate, 195 grams Rhone-Poulenc ® cerium carbonate dissolved in nitric acid. Diluted to 200 mL with distilled water. pH of this cerium concentrate was approximately 2.2. | Cerium concentration is approximately 371,000 ppm. |
| G-III | A cerium solution prepared from 20 mL per liter of cerium concentrate (Ce—C) diluted with distilled water. pH upon dilution was approximately 4.7, adjusted to 4.0 to with nitric acid. | Cerium concentration is approximately 7,400 ppm. |
| C-Seal | A cerium solution prepared from 25 mL per liter of cerium concentrate (Ce—C) diluted with distilled water. pH upon dilution was approximately 4.7, adjusted to 2.2 to with nitric acid. | Cerium concentration is approximately 9,250 ppm. |
| Silicate | A sodium silicate solution: 10% v/v PQ Corporation's Sodium Silicate N ® in distilled water. pH of the working solution was approximately 11.2. | Sodium silicate concentration is approximately 74,000 ppm |

Chromate in Table 2 represents the series 2024 aluminum panels used for testing, but instead are coated with approximately 2.0 grams chromate per square meter. Reference ASTM B449.1.

TABLE 2

Hydrophilicity, paint adhesion and corrosion resistance (pitting in accelerated salt spray testing) of Group III-A, Group IV-A, and Group IV-A/Group III-A combinations compared to each other and to chromate. Chromium-free coatings were dried for 7 minutes at 280° F. All pretreatment stages (10 minutes) were rinsed with DI water prior to succeeding stages. Final (sealing) stages (10 minutes) were not rinsed prior to oven drying.

| Stage: | Activate (80° F.) 1 | Condition (150° F.) 2 | R stages = 110° F. Silicate = 110° F. Oxidizer = 180° F. G-III = 130° F. 3 | R stages = 110° F. Silicate = 110° F. Oxidizer = 180° F. 4 | R stages = 110° F. Silicate = 110° F. 5 | % Pitting coverage after 24 hrs salt spray | % of Surface Wetted* with DI Water Rinse | Paint Adhesion before salt spray | Paint Adhesion after salt spray |
|---|---|---|---|---|---|---|---|---|---|
| 1 | A-2024 | C-ZT | RS-Z | — | — | 80 | 0 | 100 | 80 |
| 2 | A-2024 | C-ZT | RS-Z+1.0 mL Ce-C | — | — | 80 | 0 | 100 | 100 |
| 3 | A-2024 | C-ZT | RS-Z+4.0 mL Ce-C | — | — | 80 | 50 | 100 | 90 |
| 4 | A-2024 | C-ZT | RS-Z+12.0 mL Ce-C | — | — | 70 | 80 | 100 | 100 |
| 5 | A-2024 | C-ZT | RS-Z 0.5 | — | — | 90 | 0 | 100 | 80 |
| 6 | A-2024 | C-ZT | RS-Z 0.5+1.0 mL Ce-C | — | — | 80 | 0 | 100 | 90 |
| 7 | A-2024 | C-ZT | RS-Z 0.5+4.0 mL Ce-C | — | — | 70 | 50 | 100 | 90 |
| 8 | A-2024 | C-ZT | RS-Z 0.5+12.0 mL Ce-C | — | — | 70 | 80 | 100 | 100 |
| 9 | A-2024 | C-ZT | RS-Z-PVA | — | — | 60 | 0 | 100 | 90 |
| 12 | A-2024 | C-ZT | RS-Z-PVA+1.0 mL Ce-C | — | — | 60 | 0 | 100 | 100 |
| 10 | A-2024 | C-ZT | RS-Z-PVA+4.0 mL Ce-C | — | — | 17 | 10 | 100 | 100 |
| 11 | A-2024 | C-ZT | RS-Z-PVA+12.0 mL Ce-C | — | — | 3 | 40 | 100 | 100 |
| 13 | A-2024 | C-ZT | Silicate | — | — | 0 | 100 | 50 | 0 |
| 14 | A-2024 | C-ZT | Oxidizer | RS-Z | — | 9 | 0 | 100 | 80 |
| 15 | A-2024 | C-ZT | Oxidizer | RS-Z+1.0 mL Ce-C | — | 17 | 0 | 100 | 90 |
| 16 | A-2024 | C-ZT | Oxidizer | RS-Z+4.0 mL Ce-C | — | 35 | 30 | 100 | 100 |
| 17 | A-2024 | C-ZT | Oxidizer | RS-Z+12.0 mL Ce-C | — | 20 | 50 | 100 | 100 |
| 18 | A-2024 | C-ZT | Oxidizer | RS-Z 0.5 | — | 17 | 0 | 100 | 80 |
| 19 | A-2024 | C-ZT | Oxidizer | RS-Z 0.5+1.0 mL Ce-C | — | 35 | 0 | 100 | 100 |
| 20 | A-2024 | C-ZT | Oxidizer | RS-Z 0.5+4.0 mL Ce-C | — | 60 | 10 | 100 | 100 |
| 21 | A-2024 | C-ZT | Oxidizer | RS-Z 0.5+12.0 mL Ce-C | — | 50 | 50 | 100 | 100 |
| 22 | A-2024 | C-ZT | Oxidizer | RS-Z-PVA | — | 25 | 0 | 100 | 90 |
| 23 | A-2024 | C-ZT | Oxidizer | RS-Z-PVA+1.0 mL Ce-C | — | 13 | 0 | 100 | 100 |
| 24 | A-2024 | C-ZT | Oxidizer | RS-Z-PVA+4.0 mL Ce-C | — | 25 | 0 | 100 | 100 |
| 25 | A-2024 | C-ZT | Oxidizer | RS-Z-PVA+12.0 mL Ce-C | — | 17 | 0 | 100 | 100 |
| 26 | A-2024 | C-ZT | Oxidizer | Silicate | — | 0 | 100 | 50 | 0 |

TABLE 2-continued

Hydrophilicity, paint adhesion and corrosion resistance (pitting in accelerated salt spray testing) of Group III-A, Group IV-A, and Group IV-A/Group III-A combinations compared to each other and to chromate. Chromium-free coatings were dried for 7 minutes at 280° F. All pretreatment stages (10 minutes) were rinsed with DI water prior to succeeding stages. Final (sealing) stages (10 minutes) were not rinsed prior to oven drying.

| Stage: | Activate (80° F.) 1 | Condition (150° F.) 2 | R stages = 110° F. Silicate = 110° F. Oxidizer = 180° F. G-III = 130° F. 3 | R stages = 110° F. Silicate = 110° F. Oxidizer = 180° F. 4 | R stages = 110° F. Silicate = 110° F. 5 | % Pitting coverage after 24 hrs salt spray | % of Surface Wetted* with DI Water Rinse | Paint Adhesion before salt spray | Paint Adhesion after salt spray |
|---|---|---|---|---|---|---|---|---|---|
| 27 | A-2024 | C-ZT | G-III | Oxidizer | RS-Z | 15 | 0 | 100 | 80 |
| 28 | A-2024 | C-ZT | G-III | Oxidizer | RS-Z+1.0 mL Ce-C | 3 | 10 | 100 | 80 |
| 29 | A-2024 | C-ZT | G-III | Oxidizer | RS-Z+4.0 mL Ce-C | 3 | 40 | 100 | 100 |
| 30 | A-2024 | C-ZT | G-III | Oxidizer | RS-Z+12.0 mL Ce-C | 0 | 50 | 100 | 100 |
| 31 | A-2024 | C-ZT | G-III | Oxidizer | RS-Z 0.5 | 15 | 0 | 100 | 70 |
| 32 | A-2024 | C-ZT | G-III | Oxidizer | RS-Z 0.5+1.0 mL Ce-C | 0 | 0 | 100 | 100 |
| 33 | A-2024 | C-ZT | G-III | Oxidizer | RS-Z 0.5+4.0 mL Ce-C | 7 | 10 | 100 | 100 |
| 34 | A-2024 | C-ZT | G-III | Oxidizer | RS-Z 0.5+12.0 mL Ce-C | 7 | 50 | 100 | 100 |
| 35 | A-2024 | C-ZT | G-III | Oxidizer | RS-Z-PVA | 5 | 0 | 100 | 100 |
| 36 | A-2024 | C-ZT | G-III | Oxidizer | RS-Z-PVA+1.0 mL Ce-C | 0 | 0 | 100 | 100 |
| 37 | A-2024 | C-ZT | G-III | Oxidizer | RS-Z-PVA+4.0 mL Ce-C | 0 | 0 | 100 | 100 |
| 38 | A-2024 | C-ZT | G-III | Oxidizer | RS-Z-PVA+12.0 mL Ce-C | 0 | 10 | 100 | 100 |
| 39 | A-2024 | C-ZT | G-III | Oxidizer | Silicate | 0 | 100 | 50 | 0 |
| 40 | A-2024 | C-ZT | C-Seal, 120° F. | — | — | 70 | 100 | 0 | 0 |
| 41 | A-2024 | C-ZT | G-III | Oxidizer | C-Seal, 120° C. | 50 | 100 | 30 | 0 |
| 42 | A-2024 | C-ZT | — | — | — | 100 | 100 | 100 | 100 |
| Chrome | Clean | Deoxidizer | Chromate | — | — | 3 | 0 | 90 | 80 |

Some wetting with discontinuity is seen for some combinations; 100 = completely hydrophilic, 0 = completely hydrophobic by visual inspection. All results are all for 2024 aluminum panels. Pitting is evaluated on unpainted panels; results are ± approximately 10% of assigned value.

It is clear from Table 2 that there is a pronounced trend toward to improved corrosion protection with addition of a Group III-A metal to an aqueous, low-fluoride Group IV-A system. The trend is clear in numbers 1 through 12 and 27 through 38. Results for systems 14 through 25 are inconclusive for corrosion protection but clear for increased hydrophilicity with Group III-A addition. Of course, hydrophilicity and corrosion protection are typically considered to be at odds (silicates providing, the exception) and there is evidently some balance in this lent by Group III-A inclusion in Group IV-A systems. For corrosion protection, it is evident that a Group III-A metal is particularly beneficial in Group IV-A systems when a polyvinyl alcohol is also present, PVA giving additional hydrophobic character.

It is also clear from Table 2 that an oxidizing stage is very beneficial prior to Group IV-A systems which do not contain Group III-A metals. It may be counter productive for Group IV-A systems which do contain Group III-A metals unless an intervening (prior to the oxidizer) Group III-A pretreatment (or perhaps other type of pretreatment) is used. This would not be predicted, but the results indicate this.

While the preferred embodiments of the invention have been disclosed, it should be appreciated that the invention is susceptible of modification without departing from the spirit of the invention or the scope of the invention.

I claim:

1. An aqueous composition for coating a substrate comprising:
   (a) at least one dissolved Group IV-A metal selected from the group consisting of titanium, zirconium, hafnium, and combinations thereof, wherein the concentration of said Group IV-A metal is from about $1.0 \times 10^{-6}$ M to about 2.0 M in said aqueous composition;
   (b) at least one anion selected from the group consisting of an oxyanion, a non-oxyanion with a charge-to-radius ratio having an absolute value less than about 0.735, and any combination thereof, wherein said anion is present in an amount such that said Group IV-A metal remains soluble;
   (c) at least one element selected from the group consisting of scandium, yttrium, lanthanum, actinium, lanthanides having an atomic number of from 58 through 71, and any combination thereof, wherein said at least one element is present in an amount of at least about $1.0 \times 10^{-8}$ M;
   (d) fluoride atoms which are optionally present in a mole ratio of less than about: [4×(molar concentration of each Group IV-A metal)]+[3×(molar concentration of each element in (c))];
   (e) sufficient hydrogen ion in a concentration sufficient to maintain the composition at a pH less than 7.0; and
   (f) water.

2. The composition according to claim 1 wherein said element in (c) is a Group III-A element selected from the group consisting of the lanthanides from atomic number 58 to 71, and any combination thereof.

3. The composition according to claim 1, wherein the substrate is selected from the group consisting of metals, glasses, paints, ceramics, cements, and combinations thereof.

4. The composition according to claim 1, wherein the substrate comprises a metal selected from the group consisting of steel, magnesium, aluminum, alloys thereof, and combinations thereof.

5. The composition according to claim 4, wherein the metal is a copper-bearing alloy of aluminum.

6. The composition according to claim 1, further comprising at least one water-soluble metal oxide or metalloid oxide.

7. The composition according to claim 6, wherein the at least one metal oxide or metalloid oxide is selected from the group consisting of borates, stannates, phosphates, silicates, chromates, zincates, tungstates, and combinations thereof.

8. The composition according to claim 1, further comprising at least one organic oxygenate.

9. The composition according to claim 8, wherein the organic oxygenate is selected from the group consisting of siloxanes, hydroxylated organic compounds, and combinations thereof.

10. The composition according to claim 9, wherein the organic oxygenate is a hydroxylated organic selected from the group consisting of polyvinyl alcohols and combinations thereof.

11. The composition according to claim 1, further comprising at least one Group II-A element.

12. The composition according to claim 11, wherein the Group II-A metal is calcium.

13. The composition according to claim 1, wherein the Group IV-A metal is zirconium.

14. The composition according to claim 1 wherein the element in (c) is yttrium.

15. The composition according to claim 1, wherein the lanthanide is cerium.

16. The composition according to claim 1, wherein the hydrogen ion and the anion are a corresponding conjugate acid-base.

17. The composition according to claim 1, wherein the anion is an oxyanion comprising a counter-ion of said Group IV-A metal.

18. The composition according to claim 1, wherein the non-oxyanion is a counter-ion of said Group IV-A metal.

19. The composition according to claim 1, wherein the Group IV-A metal is present in a concentration of between about 0.02 M and about 0.4 M in said aqueous composition.

20. The composition according to claim 1, wherein the anion is present in a concentration of between about 0.01 M and about 3.2 M in said aqueous composition and the molar ratio of said oxyanion to Group IV-A metal ion is between about 0.5:1 and about 8:1.

21. The composition according to claim 1, wherein the hydrogen ion comprises hydronium ion in a concentration sufficient to provide a pH between about 1.5 and about 3.5.

22. The composition according to claim 1, wherein zirconium carbonate is a source of the Group IV-A metal, cerium carbonate is a source of the element in (c), and an oxyacid is a source of the anion.

23. The composition according to claim 22, wherein the oxyacid is nitric acid.

24. The composition according to claim 1, wherein zirconium carbonate is a source of the Group IV-A metal, cerium carbonate is a source of the element in (c), and a halo-acid is a source of the anion.

25. The composition according to claim 24, wherein the haloacid is hydrochloric acid.

26. The composition according to claim 1, further comprising at least one water-soluble chelant in an amount sufficient to complex metals other than or in addition to Group IV-A or Group III-A metals.

27. The composition according to claim 26, wherein the chelant comprises an azole derivative.

28. The composition according to claim 1, further comprising a water-soluble pH modifier in an amount in which the pH of said composition is maintained below 7.0.

29. The composition according to claim 28, wherein the pH modifier is an organic Lewis base.

30. The composition according to claim 1, further comprising water-soluble cations in an amount sufficient to induce gellation of the composition.

31. The composition according to claim 1, wherein the oxyanion is polyvalent.

* * * * *